Patented July 21, 1925.

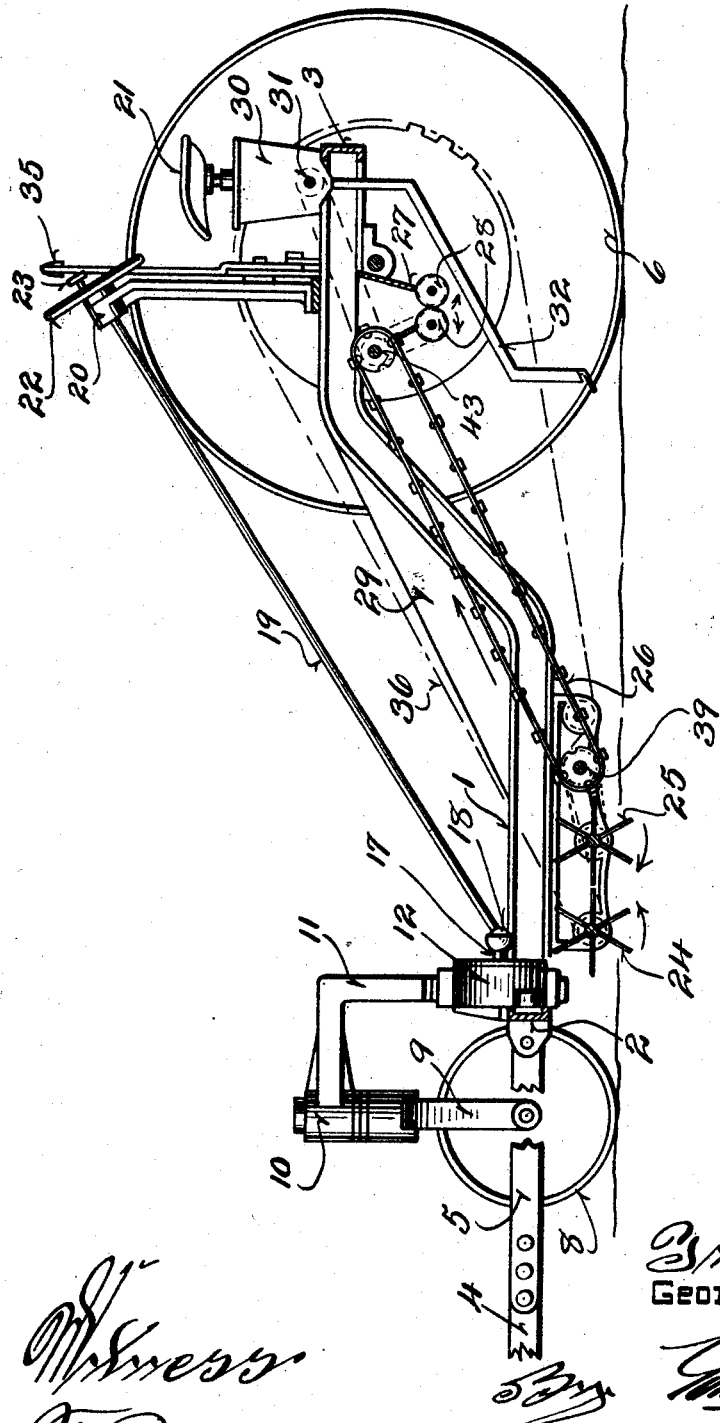

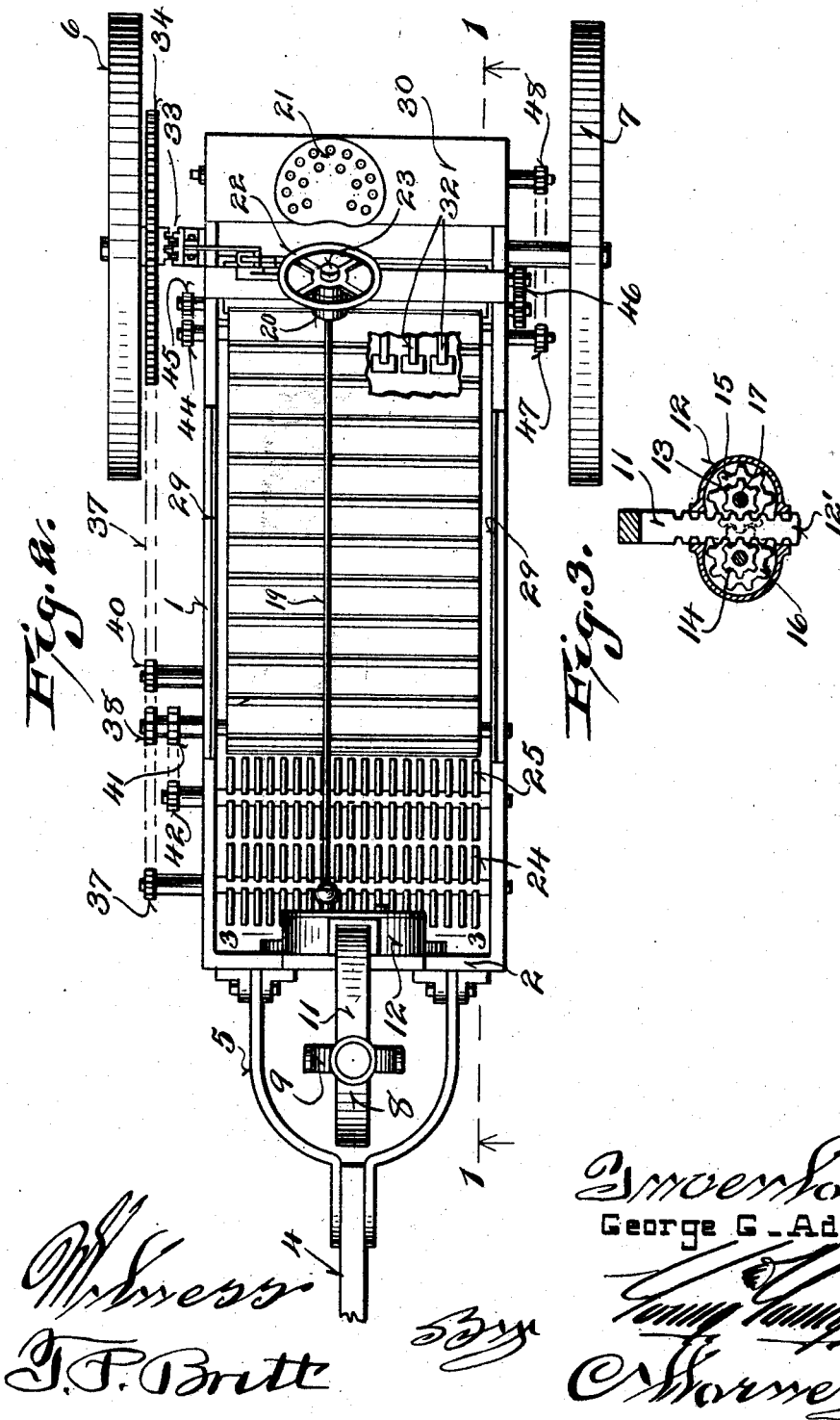

1,546,818

UNITED STATES PATENT OFFICE.

GEORGE G. ADDLER, OF WEST ALLIS, WISCONSIN.

COMBINATION SEEDER AND SEEDER BEDDER.

Application filed June 21, 1923. Serial No. 646,803.

*To all whom it may concern:*

Be it known that I, GEORGE G. ADDLER, a citizen of the United States, and resident of West Allis, in the county of Milwaukee and State of Wisconsin, have invented certain new and useful Improvements in Combination Seeders and Seeder Bedders; and I do hereby declare that the following is a full, clear, and exact description thereof.

This invention relates to a combined seeder and seeder bedding machine.

Objects of this invention are to provide a machine which is adapted to remove the top soil, break it up and discharge it rearwardly of the machine, and to distribute seeds in advance of this divided or broken up soil so that the seeds will be covered with a layer of finely divided or pulverized soil, and will be covered to a uniform depth.

Further objects are to provide a planting machine which is provided with spiked rolls adjacent the front thereof to break up and elevate the soil and which is equipped with an endless conveyor adapted to carry the soil rearwardly of the machine and discharge it therefrom in a pulverized condition rearwardly of the seeding mechanism, and to provide a machine in which the digging spiked rolls may be elevated from the operator's seat and the mechanism thrown into and out of operation.

An embodiment of the invention is shown in the accompanying drawings, in which:—

Figure 1 is a sectional side elevation of the machine such figure corresponding to a section on the line 1—1 of Figure 2.

Figure 2 is a plan view of the machine with a portion broken away.

Figure 3 is a sectional view through the elevating mechanism, such view corresponding to a section on the line 3—3 of Figure 2.

The machine comprises a chassis which is composed of a skeleton frame work having side channel frame bars 1 which extend upwardly and rearwardly and which are joined by front and rear channel bars 2 and 3. A draft tongue 4 is pivotally joined to the machine by means of the pivoted curved arms 5 (see Figure 2).

The rear portion of the machine is supported by relatively large wheels 6 and 7 which are mounted for independent rotary motion upon the axle.

The forward portion of the machine is supported by a relatively smaller front wheel 8 carried in a fork 9 pivotally supported in a bearing 10. The bearing 10 is carried by an angular arm 11 which projects downwardly into a casing 12 and is guided thereby. The lower portion of the arm 11 is formed with teeth which constitute in effect a lower rack 12 forming a continuation of such arm.

From Figure 3 it will be seen that teeth are provided upon opposite sides of the rack 12 and that these teeth are engaged by pinions 13 and 14 rigidly associated with larger intermeshing pinions 15 and 16, one of such pinions, for instance, 15 being rigidly secured upon an outwardly projecting shaft 17. This shaft, as may be seen from Figure 1, terminates in a universal joint 18 and is connected with an upwardly and rearwardly extending shaft 19. The shaft 19 is carried by a bearing 20 adjacent the operator's seat 21 and is provided with a manipulating hand-wheel 22. If desired, suitable locking means 23 may be provided to lock the hand-wheel in position such, for instance, as a sliding pin. It is, of course, to be understood that worm and worm wheel mechanism may be provided for elevating the front portion of the frame and, if desired, a single elevating pinion and a single series of rack teeth may be provided for the arm 11.

Adjacent the front of the machine a forward digging spiked roll 24 is carried and extends transversely across the front of the machine. Immediately adjacent and rearwardly of this roll, a similar spiked roll 25 is provided. These rolls are adapted to dig into the top soil and to break it up and elevate it, the roll 25 being particularly serviceable in this elevating function.

Immediately behind the roll 25 an endless conveyor 26 is located and is adapted to receive the soil elevated by the digging and breaking mechanism and to convey it to the rear portion of the machine. This conveyor is adapted to discharge the soil into a chute 27 and, if desired, pulverizing rolls 28 may be located below such chute and may further pulverize the soil—the soil being discharged downwardly from these rolls. It is preferable to provide guide strips 29 (see Figure 1) to aid in holding the soil upon the conveyor. However, the frame of the machine cooperates with the conveyor throughout a large portion of its extent in holding the soil thereon.

A conventional form of seeder 30 is carried by the rear portion of the machine and is provided with a distributing or agitating roll 31. This seeder discharges the seeds down through chutes 32 and drops the seeds in a distributed manner in advance of the discharging pulverized soil.

One of the wheels, for instance, the wheel 6, is employed as a driving wheel for operating the mechanism and by means of a clutch 33 may be coupled to a large sprocket wheel 34, such clutch, of course, being controlled by a lever 35 located adjacent the operator's seat (see Figure 1). This sprocket wheel drives a chain 36 which passes over a sprocket wheel 37 secured upon the shaft of the front digging roll 24, over a sprocket wheel 38 secured upon the shaft of the driving drum 39 of the conveyor (see Figures 1 and 2), and under an idler sprocket wheel 40. The shaft of the driving drum of the conveyor is operatively connected with the rear digging roll 25 by means of the sprocket wheels 41 and 42 (see Figure 2) and a connecting sprocket chain. The shaft of the upper drum 43 of the conveyor is connected by sprocket wheels 44 and 45 and a suitable chain with the forward pulverizing roll 28 such roll being geared to the rear roll by means of the pinions 46 (see Figure 2). The shaft of the upper drum 43 of the conveyor is also provided with a sprocket wheel 47 which is connected with the sprocket wheel 48 of the distributor or agitator 31 of the seeder.

It will be seen that a machine has been provided which may be drawn over ordinary roads with the digging mechanism elevated and with the operating connection between the driving wheel and the rest of the mechanism open. It will also be seen that when the machine is at the desired place that the clutch may be closed, thus operatively coupling the various mechanisms with the driving wheel and the forward portion of the chassis may be lowered until the exact depth at which the digging rolls 24 and 25 will operate has been attained.

It will further be seen that the machine will dig, elevate, and pulverize the soil. It is to be understood, however, that the specific pulverizing rolls 28 (see Figure 1) may be omitted if desired although such rolls will more finely pulverize the soil and are desirable under certain conditions.

It will further be seen that the seed will be planted at a uniform depth and will be covered by finely divided soil.

Although one form of the invention has been described in considerable detail, it is to be understood that the invention may be variously embodied and is, therefore, to be limited only as claimed.

I claim:

A soil treating machine comprising a chassis, wheels supporting said chassis, a pair of reversely rotating spiked digging rolls mounted transversely of and adjacent the front of the machine, a conveyor adapted to convey soil elevated by said rolls and discharge it adjacent the upper rear portion of the machine, and a pair of pulverizing rolls adapted to receive the soil discharged from said conveyor and to crush it into fine particles.

In testimony that I claim the foregoing I have hereunto set my hand, in the county of Milwaukee, and State of Wisconsin.

GEORGE G. ADDLER.